(12) United States Patent
Degner et al.

(10) Patent No.: US 11,522,406 B2
(45) Date of Patent: Dec. 6, 2022

(54) TERMINAL CONNECTOR ASSEMBLY WITH AN OVERMOLDED UNIT WITH COIL END WINDINGS

(71) Applicant: Ford Global Technologies, LLC, Dearborn, MI (US)

(72) Inventors: Michael W. Degner, Novi, MI (US); Prasad Dev Hanumalagutti, Dearborn, MI (US); Franco Leonardi, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 128 days.

(21) Appl. No.: 16/930,030

(22) Filed: Jul. 15, 2020

(65) Prior Publication Data
US 2020/0350802 A1 Nov. 5, 2020

Related U.S. Application Data

(62) Division of application No. 15/869,729, filed on Jan. 12, 2018, now Pat. No. 10,749,404.

(51) Int. Cl.
*H02K 5/00* (2006.01)
*H02K 5/22* (2006.01)
(Continued)

(52) U.S. Cl.
CPC .............. *H02K 5/225* (2013.01); *B60K 6/26* (2013.01); *B60K 6/40* (2013.01); *H02K 1/145* (2013.01);
(Continued)

(58) Field of Classification Search
CPC .......... H02K 11/25; H02K 1/145; H02K 3/24; H02K 3/38; H02K 3/50; H02K 3/505; H02K 3/46; H02K 3/525; H02K 9/19; H02K 9/16; H02K 15/12; H02K 5/225; H02K 5/20; H02P 27/06; B60L 2240/425; B60Y 2306/05; B60Y 2400/604; B60Y 29/596
(Continued)

(56) References Cited

U.S. PATENT DOCUMENTS 3,457,442 A 7/1969 Charlton et al.
6,956,315 B2 10/2005 Yoon et al.
(Continued)

*Primary Examiner* — Maged M Almawri
(74) *Attorney, Agent, or Firm* — David B. Kelley; Brooks Kushman P.C.

(57) ABSTRACT

A vehicle electric machine assembly including a stator core and a terminal block is provided. The stator core includes one or more three-phase terminals connected to end windings. The terminal block includes a connector for each of the three-phase terminals. A portion of the end windings extending from the stator core, the three-phase terminals, and the terminal block are overmolded as a single unit such that a portion of each of the connectors is exposed for connection to an inverter. The terminal block may further include one or more threaded apertures, each sized to receive a threaded stud to facilitate an electrical connection between one of the one or more three-phase terminals and the inverter. Each of the one or more three-phase terminals may extend axially along an axis substantially parallel to a central axis of a rotor disposed within a cavity defined by the stator core.

5 Claims, 7 Drawing Sheets

(51) Int. Cl.
  *H02K 15/12*   (2006.01)
  *H02K 9/19*    (2006.01)
  *H02K 3/38*    (2006.01)
  *H02K 11/25*   (2016.01)
  *B60K 6/26*    (2007.10)
  *B60K 6/40*    (2007.10)
  *H02K 1/14*    (2006.01)
  *H02K 3/24*    (2006.01)
  *H02K 3/50*    (2006.01)
  *H02K 3/52*    (2006.01)
  *H02K 5/20*    (2006.01)
  *H02P 27/06*   (2006.01)

(52) U.S. Cl.
  CPC ............... *H02K 3/24* (2013.01); *H02K 3/38* (2013.01); *H02K 3/50* (2013.01); *H02K 3/525* (2013.01); *H02K 5/20* (2013.01); *H02K 9/19* (2013.01); *H02K 11/25* (2016.01); *H02K 15/12* (2013.01); *H02P 27/06* (2013.01); *B60L 2240/425* (2013.01); *B60Y 2200/92* (2013.01); *B60Y 2306/05* (2013.01); *B60Y 2400/604* (2013.01)

(58) Field of Classification Search
  USPC .............................. 310/68 C, 71, 43, 52–64
  See application file for complete search history.

(56) References Cited

U.S. PATENT DOCUMENTS

| | | | |
|---|---|---|---|
| 7,061,146 B2* | 6/2006 | Hirt | F16H 61/28 |
| | | | 310/43 |
| 7,193,345 B2 | 3/2007 | Shinzaki et al. | |
| 7,928,348 B2* | 4/2011 | Neal | H05B 6/108 |
| | | | 219/628 |
| 8,803,378 B2* | 8/2014 | Sonohara | H02K 9/193 |
| | | | 310/58 |
| 9,105,990 B2 | 8/2015 | Akuta | |
| 9,143,021 B2* | 9/2015 | Haruno | H02K 11/25 |
| 9,847,690 B2* | 12/2017 | Park | H02K 1/2733 |
| 9,935,525 B2* | 4/2018 | Koiwai | H02K 11/25 |
| 10,439,475 B2* | 10/2019 | Madsen Obel | H02K 5/18 |
| 10,468,920 B2* | 11/2019 | Sung | B60L 50/51 |
| 10,848,016 B2* | 11/2020 | Shiohara | H02K 1/146 |
| 2006/0133218 A1* | 6/2006 | Matthey | B06B 1/045 |
| | | | 368/230 |
| 2007/0278869 A1* | 12/2007 | Taketsuna | H02K 3/24 |
| | | | 310/54 |
| 2010/0045125 A1* | 2/2010 | Takenaka | H02K 1/20 |
| | | | 310/54 |
| 2012/0126646 A1* | 5/2012 | Nakagawa | H02K 5/225 |
| | | | 310/71 |
| 2012/0223601 A1* | 9/2012 | Akuta | H02K 5/203 |
| | | | 310/58 |
| 2012/0242178 A1* | 9/2012 | Miyamoto | H02K 9/19 |
| | | | 310/54 |
| 2014/0217858 A1* | 8/2014 | Haruno | H02K 5/225 |
| | | | 310/68 C |
| 2017/0267055 A1* | 9/2017 | Hanumalagutti | H02K 3/24 |
| 2018/0026493 A1* | 1/2018 | Jung | H02K 5/20 |
| | | | 310/52 |
| 2018/0109222 A1* | 4/2018 | Suzuki | H02P 29/64 |
| 2018/0288907 A1* | 10/2018 | Richards | H01L 23/473 |

* cited by examiner

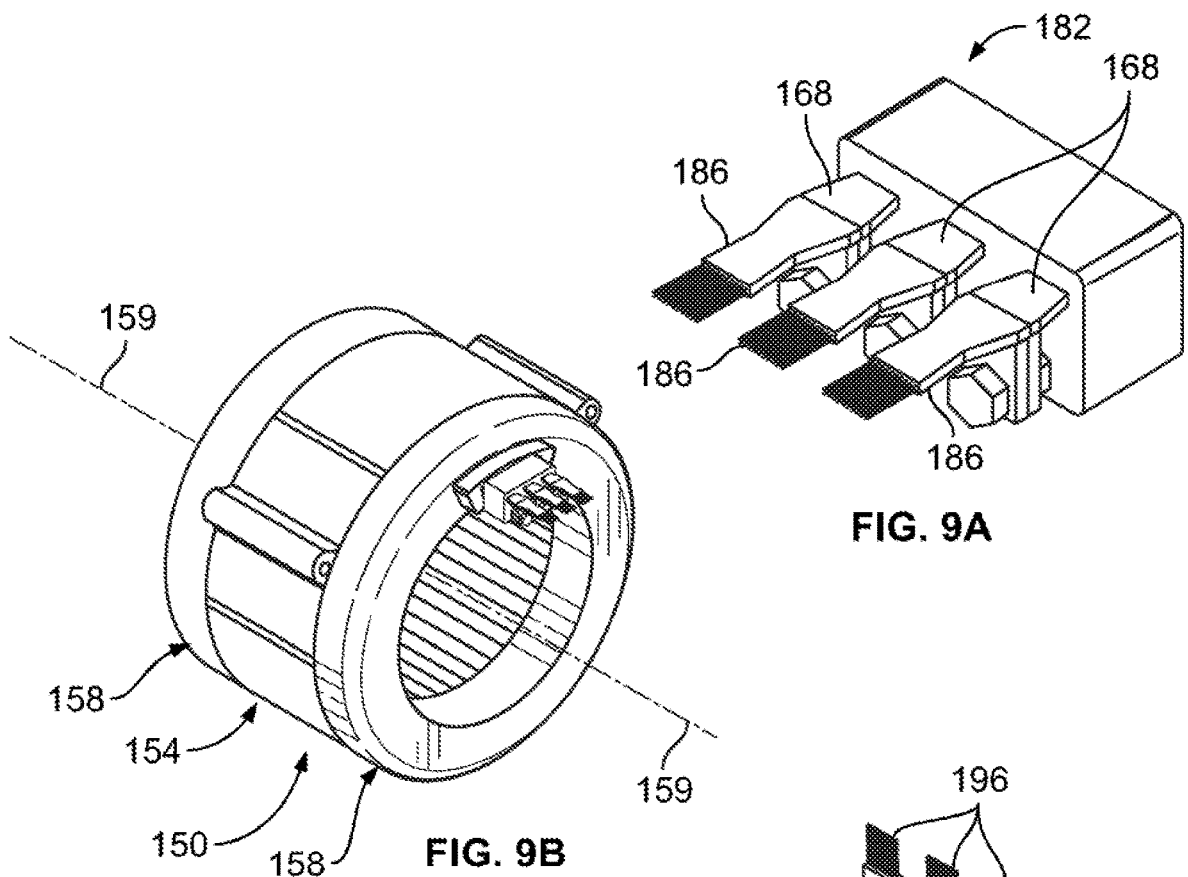
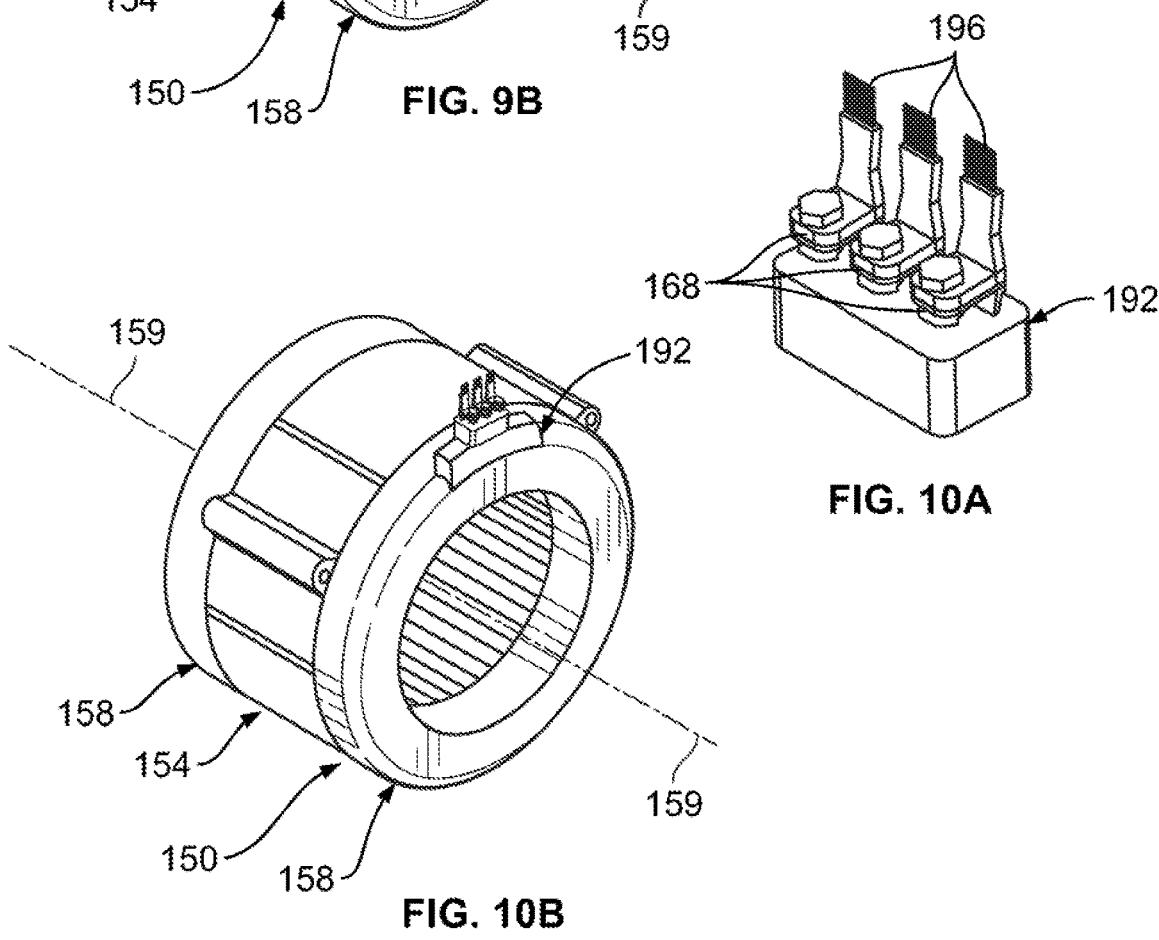

TERMINAL CONNECTOR ASSEMBLY WITH AN OVERMOLDED UNIT WITH COIL END WINDINGS

CROSS-REFERENCE TO RELATED APPLICATION

This application is a division of U.S. Application Ser. No. 15/869,729, filed Jan. 12, 2018, the disclosure of which is hereby incorporated in its entirety by reference herein.

TECHNICAL FIELD

This disclosure relates to electric machine assemblies including terminal connectors.

BACKGROUND

Vehicle electric machines include stators having end windings that carry three-phase current and are connected to an inverter via the three terminals. Existing connectors facilitating a transfer of the three-phase current may require extensive assembly time and may not be adequately supported.

SUMMARY

A vehicle electric machine assembly includes a stator core and a terminal block. The stator core includes one or more three-phase terminals connected to end windings. The terminal block includes a connector for each of the three-phase terminals. A portion of the end windings extending from the stator core, the three-phase terminals, and the terminal block are overmolded as a single unit such that a portion of each of the connectors is exposed for connection to an inverter. The terminal block may further include one or more threaded apertures, each sized to receive a threaded stud to facilitate an electrical connection between one of the one or more three-phase terminals and the inverter. Each of the one or more three-phase terminals may extend axially along an axis substantially parallel to a central axis of a rotor disposed within a cavity defined by the stator core. Each of the one or more three-phase terminals may extend radially along an axis substantially perpendicular to a central axis of a rotor disposed within a cavity defined by the stator core. The overmolded single unit may define a coolant channel oriented for thermal communication with the end windings for coolant to flow therethrough. The assembly may further include one or more temperature sensors disposed within the overmolded single unit to measure thermal conditions of the end windings. Sensor connectors may extend out of the overmolded single unit for connection to a controller. The controller may be programmed to adjust a flow of coolant within the coolant channel responsive to a temperature detection by the one or more temperature sensors of an end winding temperature outside of a predetermined threshold. The assembly may further include a receiver unit defining three cavities. Each of the connectors may define a substantially rectangular prism shape sized for insertion within one of the three cavities.

A vehicle electric machine assembly includes one or more three-phase terminals, a terminal block cap, a first overmold, and a second overmold. The one or more three-phase terminals are connected to end windings extending from a terminal block integrated with a stator core. The terminal block cap defines three cavities each sized to receive one of the one or more three-phase terminals and includes three connectors for electrical connection with an inverter. The first overmold encompasses the one or more three-phase terminals and the end windings such that a portion of each of the one or more three-phase terminals is exposed for electrical connection. The second overmold encompasses the terminal block cap such that each of the three phase terminals may be disposed within one of the three cavities for electrical connection to the three connectors. Each of the one or more three-phase terminals may be encased in an epoxy to define a substantially rectangular prism shape sized for insertion within one of the three cavities. The assembly may further include one or more temperature sensors disposed within the first overmold. The assembly may further include a coolant channel defined by the first overmold located adjacent the end windings and a controller electrically connected to the one or more temperature sensors. The controller may be programmed to direct coolant flow within the coolant channel responsive to receipt of a signal from one of the one or more temperature sensors indicating a temperature of the end windings above a predetermined threshold. The second overmold may be arranged upon the first overmold such that the one or more three-phase terminals are oriented substantially parallel to a central axis defined by the stator core. The second overmold may be arranged upon the first overmold such that the one or more three-phase terminals are oriented substantially perpendicular to a central axis defined by the stator core.

A vehicle electric machine assembly includes a stator core, a rotor, a first overmold, one or more three-phase terminals, and a second overmold. The stator core defines a cavity and includes end windings. The rotor is disposed within the cavity. The first overmold encompasses the end windings. Each of the one or more three-phase terminals is arranged with the end windings for electrical connection at a periphery portion of the first overmold. The second overmold encompasses the one or more three-phase terminals and a terminal block including one or more connectors to receive each of the three-phase terminals. The first overmold and the second overmold are formed separately such that mounting the second overmold to the first overmold electrically connects the end windings and the one or more three-phase terminals. Each of the one or more three-phase terminals may be a threaded stud sized for insertion within a threaded aperture of the second overmold. The first overmold may define a coolant channel arranged for coolant flowing therethrough to be in thermal communication with the end windings. The first overmold and the second overmold may be arranged with one another to orient the one or more three-phase terminals in parallel relative to a central axis defined by the stator core. The first overmold and the second overmold may be arranged with one another to orient the one or more three-phase terminals perpendicular to a central axis defined by the stator core.

BRIEF DESCRIPTION OF THE DRAWINGS

Figure is a schematic diagram illustrating an example of an electrified vehicle.

FIG. 9A is a perspective view of an example of a terminal block for the electric machine assembly of FIG. 3.

FIG. 9B is a perspective view of the terminal block of FIG. 9A mounted to the electric machine assembly of FIG. 3.

FIG. 10A is a perspective view of another example of a terminal block for the electric machine assembly of FIG. 3.

FIG. 10B is a perspective view of the terminal block of FIG. 10A mounted to the electric machine assembly of FIG. 3.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
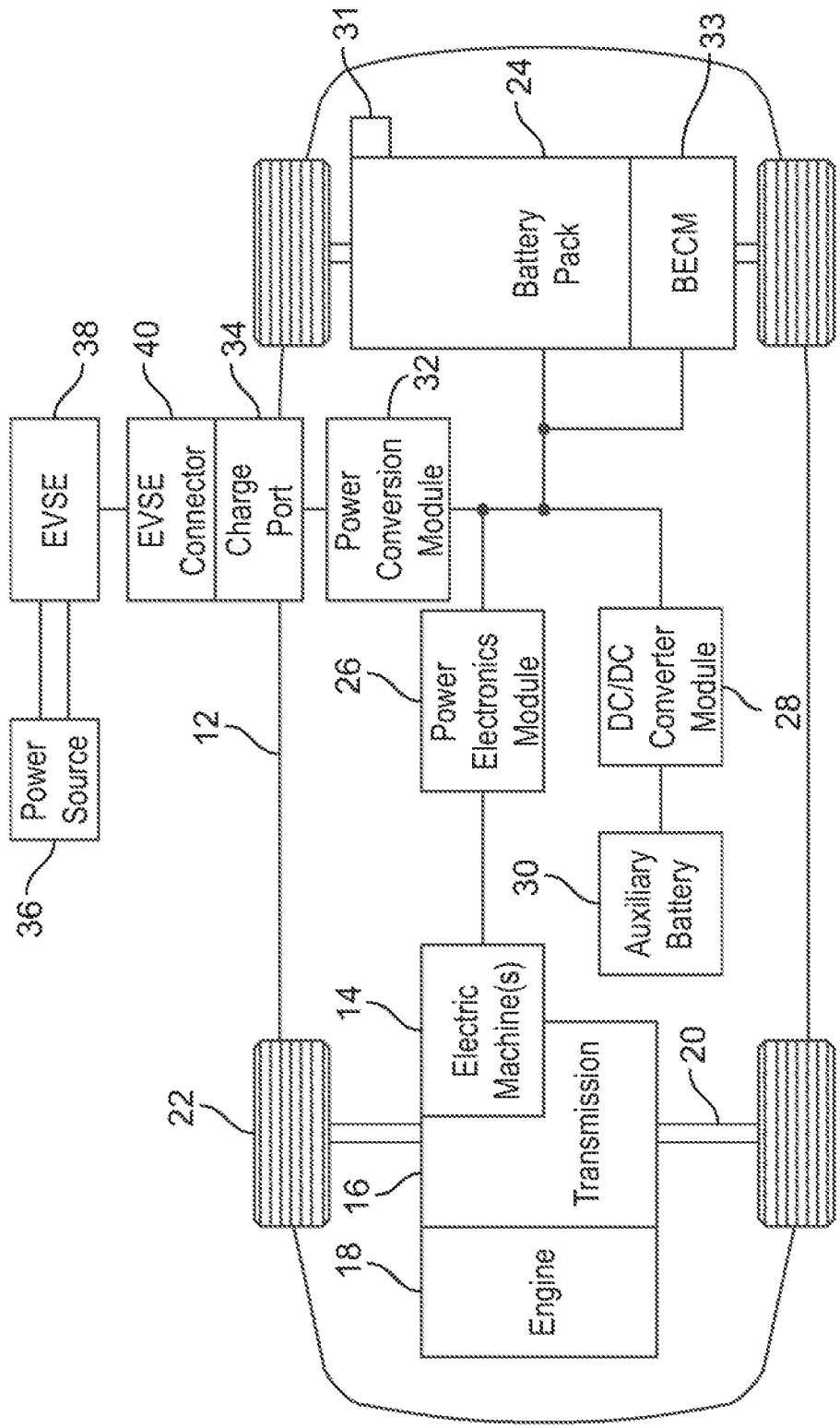

FIG. 1 is a schematic diagram illustrating an example of an electrified vehicle, referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. Each of the electric machines 14 may provide propulsion and deceleration capability when the engine 18 is turned on or off. Each of the electric machines 14 may also operate as generators and provide fuel economy benefits by recovering energy that would normally be lost as heat in the friction braking system. The electric machines 14 may also provide reduced pollutant emissions since the vehicle 12 may be operated in electric mode only under certain conditions.

A traction battery 24 stores energy that may be used by the electric machines 14. The traction battery 24 may provide a high voltage direct current (DC) output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed.

The power electronics module 26 is also electrically connected to each of the electric machines 14 and provides the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. An electrified vehicle may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 via an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of suitable port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12.

The various components discussed above may have one or more associated controllers to control and monitor the operation of the components. The controllers may communicate via a serial bus (e.g., a controller area network (CAN)) or via discrete conductors.

Figure 2:
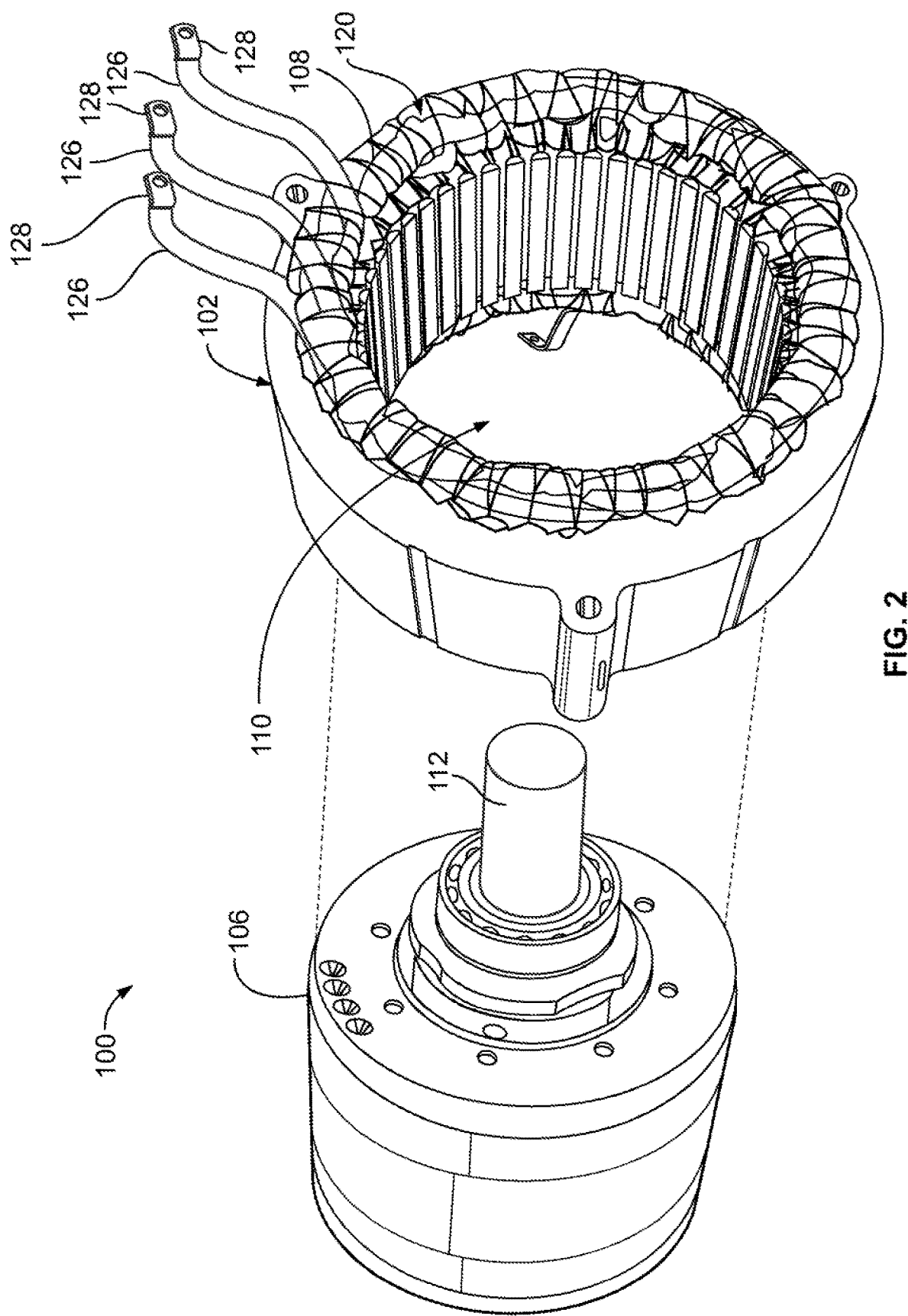
FIG. 2 is a perspective, exploded view illustrating an example of a portion of an electric machine assembly.

FIG. 2 is a partially exploded view illustrating an example of portions of an electric machine assembly for an electrified vehicle, referred to generally as an electric machine assembly 100 herein. The electric machine may include a stator core 102 and a rotor 106. As mentioned above, electrified vehicles may include more than one electric machine. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. A shaft 112 may be operably connected to the rotor 106 and may be coupled to other vehicle components to transfer mechanical power therefrom.

Windings 120 may be disposed within the cavity 110 of the stator core 102. In a motor example of an electric machine, current may be fed to the windings 120 to obtain a rotational force on the rotor 106. In a generator example of an electric machine, current generated in the windings 120 by a rotation of the rotor 106 may be used to power vehicle components. Portions of the windings 120, such as end windings 126, may protrude from the cavity 110. Terminals 128 may be mounted to the end windings 126 to transfer current to another vehicle component, such as an inverter. During operation of the electric machine assembly 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 generates a rotating magnetic field. Magnets of the rotor 106 will magnetize and rotate with the rotating magnetic field to rotate the shaft 112 for mechanical power.

Figure 3:
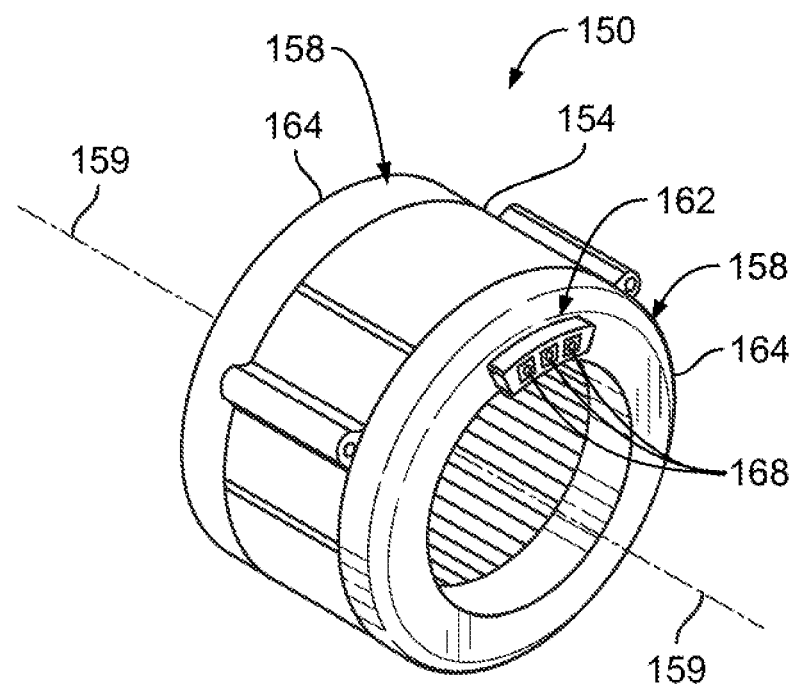
FIG. 3 is a perspective view of an example of a portion of an electric machine assembly.
Figure 4:
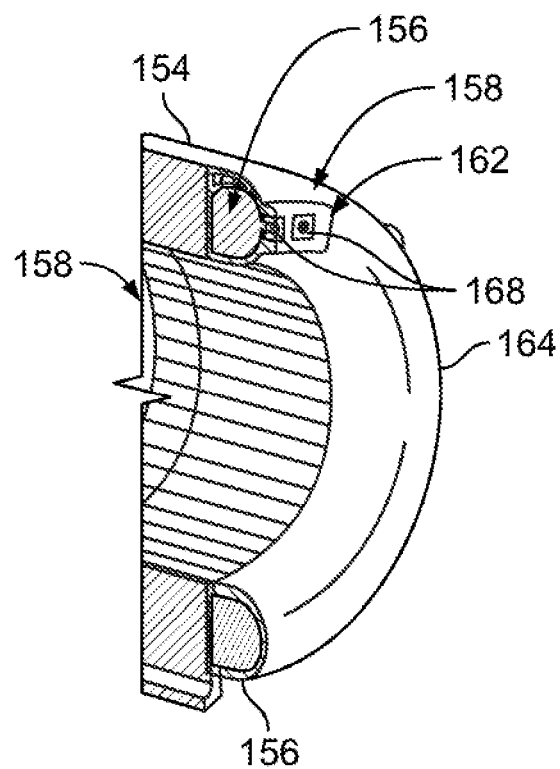
FIG. 4 is a fragmentary perspective view, in cross-section, of a portion of the electric machine assembly of FIG. 3.
Figure 5:
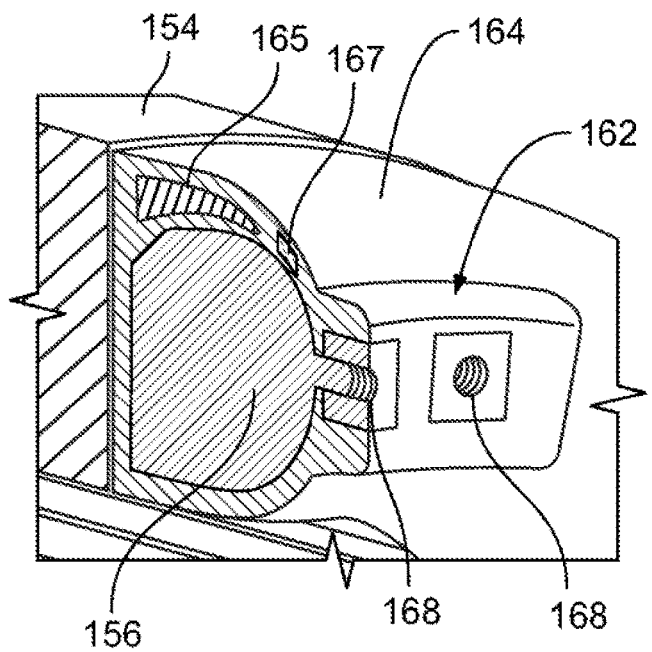
FIG. 5 is a detailed perspective view, in cross-section, of a portion of the electric machine assembly of FIG. 3.

FIGS. 3 through 5 illustrate an example of a portion of an electric machine assembly, referred to as an electric machine assembly 150 herein. The electric machine assembly 150 includes a stator core 154, end windings 156, and a pair of encasement assemblies 158. The stator core 154 may define a central axis 159. A portion of the end windings 156 shown in FIGS. 4 and 5 extends from the stator core 154. The central axis 159 may correspond to a central axis of a shaft (not shown) disposed within the stator core. Each of the pair of encasement assemblies 158 may include a terminal block 162 and an encasement 164.

The terminal block 162 may encompass one or more terminals 168 arranged with the end windings 156 for electrical connection. Each of the one or more terminals 168 may be a three-phase terminal to transfer power from the end windings 156 to another vehicle component, such as an inverter (not shown).

The encasement 164 may encompass the end windings 156 and the one or more terminals 168. For example, the encasement 164 may be of a material overmolded about the end windings 156 and the one or more terminals 168 to form a single unit with the terminal block 162. Optionally, the terminal block 12 may be formed as an overmolded unit separate from the encasement 164. In one example, the encasement 164 may be a conductive or a non-conductive epoxy suitable for use with an electric machine.

Optionally, the encasement 164 may define a coolant channel 165 located adjacent the end windings 156. The coolant channel 165 may be sized for coolant to flow therethrough to assist in managing thermal conditions of the end windings 156. A temperature sensor 167, such as a thermistor, may be in thermal communication with the end windings 156 to monitor thermal conditions thereof. It is contemplated that the temperature sensor 167 may be in alternative locations such as a location within the end windings 156.

Figure 6:
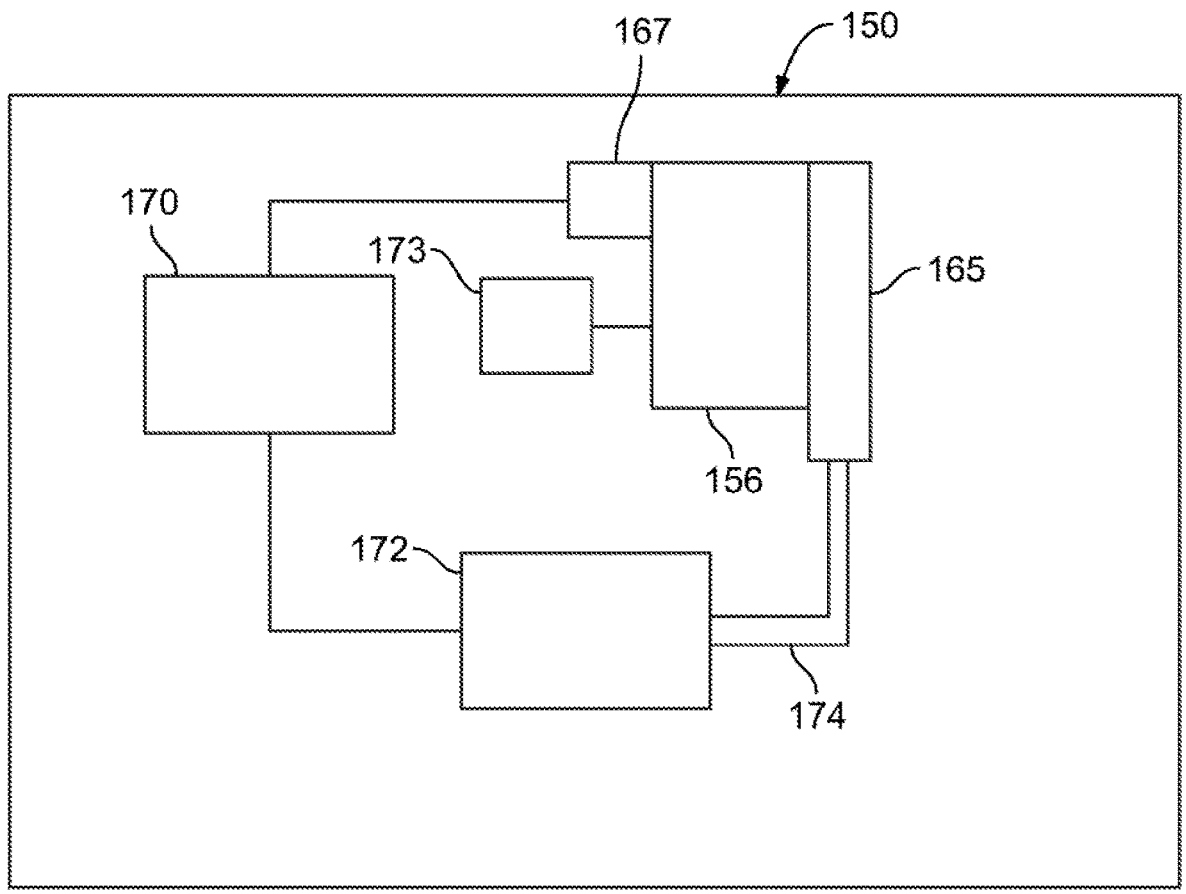
FIG. 6 is a block diagram illustrating an example of a portion of a thermal management system for the electric machine assembly of FIG. 3.

FIG. 6 is a block diagram illustrating an example of a portion of a thermal management system for the electric machine assembly 150. A controller 170 may be in communication with the temperature sensor 167 and a coolant distributor 172. The end windings 156 may be electrically connected to an inverter 173. The coolant distributor 172 may include a coolant reservoir (not shown) and may operate to distribute coolant to the coolant channel 165 via a conduit 171 to assist in managing thermal conditions of the end windings 156. For example, the controller 170 may be programmed to, responsive to receipt of a signal from the temperature sensor 167 indicating a temperature of the end windings 156 is above of a predetermined threshold, activate the coolant distributor 172 to deliver coolant to the coolant channel 165 via the conduit 171. In one example, the predetermined threshold may be a temperature between 120° C. and 140° C. In another example, the coolant distributor 172 may include a pump in fluid communication with coolant disposed within the coolant channel 165. The controller may be programmed to activate the pump to adjust a flow rate of the coolant within the coolant channel 165 to assist in managing thermal conditions of the end windings 156 responsive to receipt of a signal from the temperature sensor 167 indicating a temperature of the end windings is above the predetermined threshold.

Figure 7:
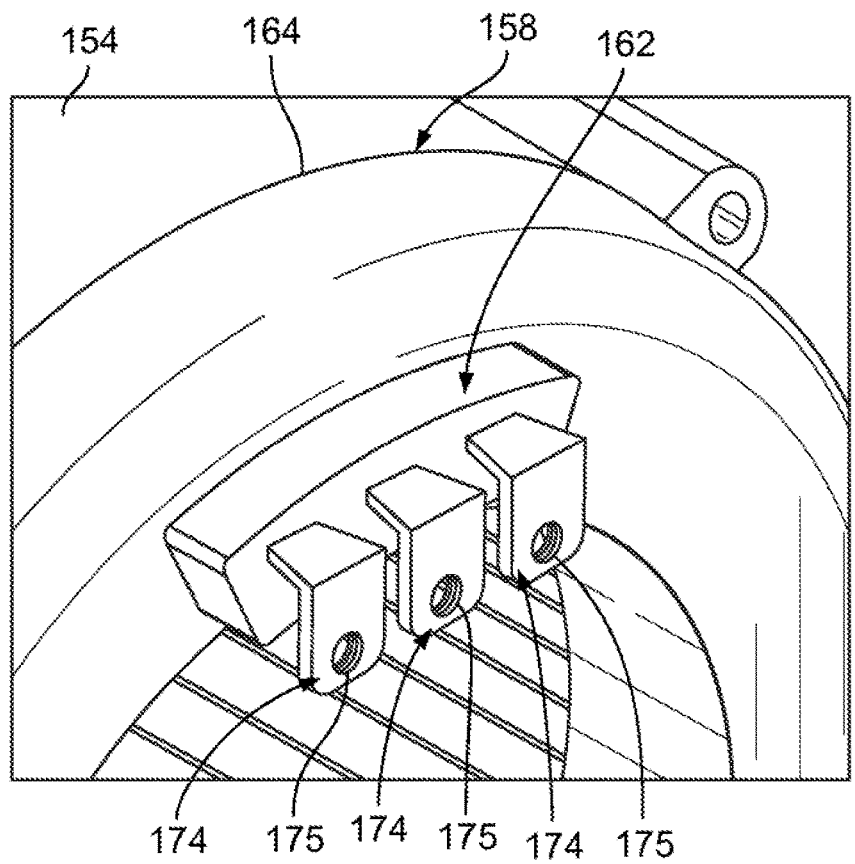
FIG. 7 is a fragmentary perspective view of the electric machine assembly of FIG. 3 illustrating an example of phase terminals.
Figure 8:
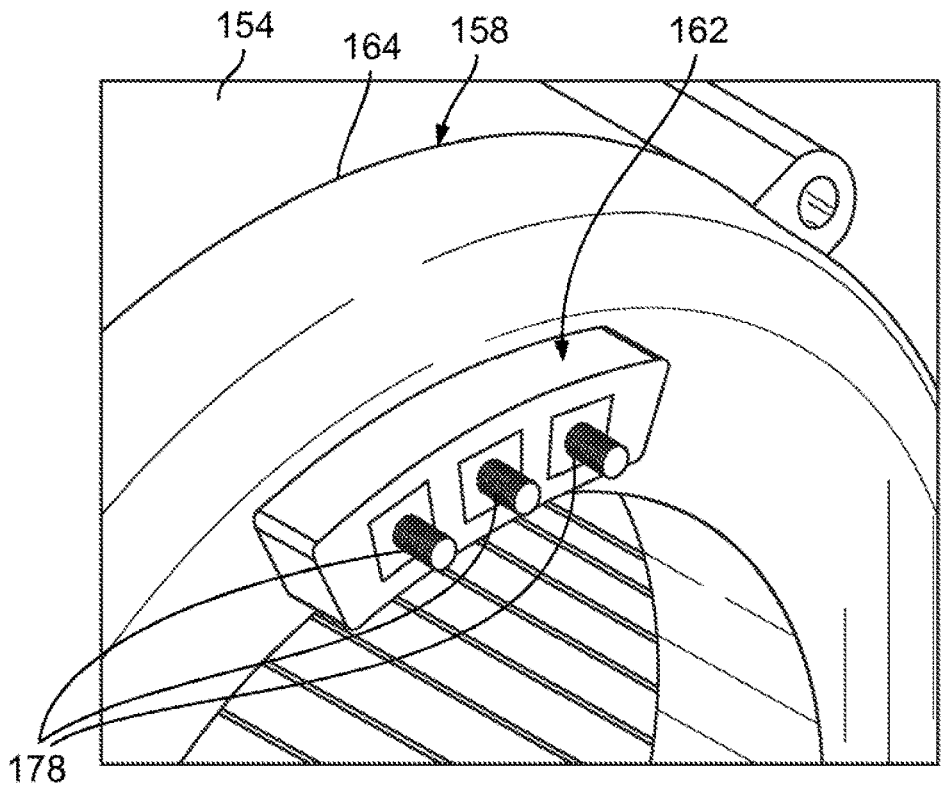
FIG. 8 is a fragmentary perspective view of the electric machine assembly of FIG. 3 illustrating another example of phase terminals.

The terminal block 162 may be shaped to accommodate various types of terminals as illustrated in FIGS. 7 and 8. For example, in FIG. 7 terminals 174 extend from the end windings 156 (not shown in FIG. 7) and through the terminal block 162. In this example, the terminals 174 define a ninety degree bend and include an eyelet 175 to receive a fastener. In FIG. 8, terminals 178 are threaded studs electrically connected to the end windings 156 (not shown in FIG. 8). Each of the threaded studs may correspond to a threaded aperture of the terminal block 162 for mounting thereto.

FIGS. 9A and 9B illustrate an example of an axial terminal block 182 for the electric machine assembly 150. The axial terminal block 182 is arranged with the electric machine assembly 150 so that each of the one or more terminals 168 extending from the end windings 156 (not shown in Figures (A or 9B) is oriented substantially parallel with the central axis 159. In this example, corresponding inverter terminals 186 are also oriented substantially parallel to the central axis 159. The axial terminal block 182 may be used based on available packaging space (e.g. based on inverter location).

FIGS. 10A and 10B illustrate an example of a radial terminal block 192 for the electric machine assembly 150. The radial terminal block 192 is arranged with the electric machine assembly 150 so that each of the one or more terminals 168 extending from the end windings 156 (not shown in FIG. 10A or 10B) is oriented substantially perpendicular with the central axis 159. In this example, corresponding inverter terminals 196 are also oriented substantially perpendicular to the central axis 159. The radial terminal block 192 may be used based on available packaging space (e.g. based on inverter location).

Figure 11A:
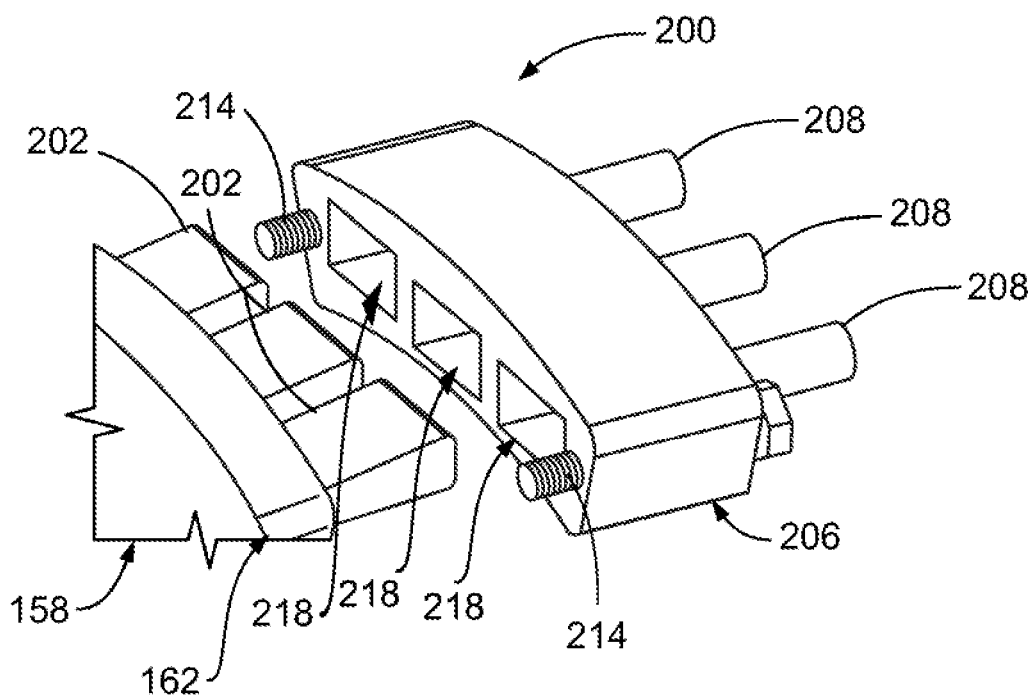
FIG. 11A is a perspective view of another example of a terminal block for the electric machine assembly of FIG. 3.
Figure 11B:
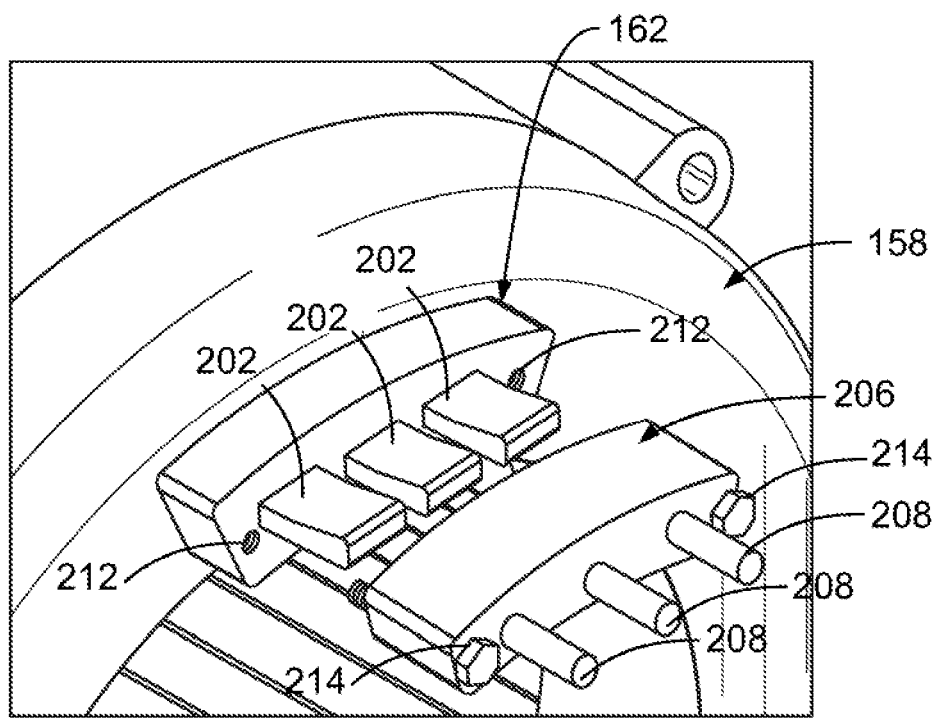
FIG. 11B is a perspective view of the terminal block of FIG. 10A mounted to the electric machine assembly of FIG. 3.

FIGS. 11A and 11B illustrate another example of a terminal assembly for the electric machine assembly 150, referred to as a terminal assembly 200. The terminal assembly 200 may include a terminal block, such as the terminal block 162, three first connectors 202 (male connectors), and a terminal block cap, such as a receiver unit 206, having three second connectors 208 (female connectors). The terminal block 162 may include a pair of apertures 212 each sized to receive one of a pair of fasteners 214 of the receiver unit 206. The three first connectors 202 may extend from the terminal block 162. The receiver unit 206 may include three cavities 218 each corresponding to one of the three first connectors 202. Each of the three cavities 218 may be arranged with one of the three second connectors 208 to facilitate an electrical connection between the three first connectors 202 and the three second connectors 208. For example, the three second connectors 208 may be electrically connected to an inverter (not shown) such that the inverter may receive energy from the electric machine assembly 150 when the three first connectors 202 and the three second connectors 208 are in electrical communication with one another.

Various shapes and sizes are available for the first connectors 202 and the three cavities 218 to assist in aligning and mounting the receiver unit 206 to the terminal block 162. In this example, the three first connectors 202 and the three cavities 218 are each shown having a substantially rectangular prism shape. It is contemplated that in another embodiment the male and female aspects of the three first connectors 202 and the three cavities 218 may be flip-flopped. It is also contemplated that each of the three first connectors 202 may be covered with an epoxy and/or may be overmolded with the terminal block 162.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle electric machine assembly comprising:
   a stator core including a plurality of three-phase terminals each connected to an end winding and having a substantially trapezoidal shape;
   and
   a terminal block including a connector, for each of the three-phase terminals, that has a substantially trapezoidal end defining a widest edge that abuts a widest edge of a corresponding one of the three-phase terminals,
   wherein a portion of the end windings extending from the stator core, the three-phase terminals, and the terminal block are overmolded as a single unit such that a portion of each of the connectors is exposed for connection to an inverter.

2. The assembly of claim 1, wherein each of the one or more three-phase terminals extends axially along an axis substantially parallel to a central axis of a rotor disposed within a cavity defined by the stator core.

3. The assembly of claim 1, wherein each of the one or more three-phase terminals extends radially along an axis substantially perpendicular to a central axis of a rotor disposed within a cavity defined by the stator core.

4. The assembly of claim 1, wherein the overmolded single unit defines a coolant channel oriented for thermal communication with the end windings for coolant to flow therethrough.

5. The assembly of claim 4 further comprising one or more temperature sensors disposed within the overmolded single unit to measure thermal conditions of the end windings and having sensor connectors extending out of the overmolded single unit for connection to a controller, wherein the controller is programmed to adjust a flow of coolant within the coolant channel responsive to a temperature detection by the one or more temperature sensors of an end winding temperature outside of a predetermined threshold.

* * * * *